United States Patent Office 3,260,685
Patented July 12, 1966

3,260,685
NOVEL HALO AND AMIDO SUBSTITUTED PHENYLTRIPHOSPHONITRILES AND PREPARATION THEREOF
Rip G. Rice and Bernard Grushkin, Silver Spring, Md., assignors to W. R. Grace & Co., New York, N.Y., a corporation of Connecticut
No Drawing. Filed June 11, 1963, Ser. No. 286,955
27 Claims. (Cl. 260—2)

The present invention relates to the production of novel phosphonitrilic compounds, and more specifically to polymer forming mono and dihalo phenylated triphosphonitriles, ammoniated derivatives thereof, and polymers formed therefrom.

Considerable interest has developed in so called inorganic polymers, which do not contain carbon to carbon bonds in their polymeric backbones. The ability of these polymers to withstand high temperatures makes them particularly useful in modern technology.

Among the first inorganic polymers developed were the polymeric phosphonitrile halides which possess the repeating structural unit

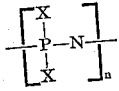

wherein X represents halogen and $n$ represents the number of repeating units in the polymeric structure. These polymeric phosphonitrilic halide polymers are linear in nature and possess elastomeric properties. Hence the term "inorganic rubber" is often used to describe them.

While the above described phosphonitrilic halides possess reasonable stability towards heat (350° C.), it is found they readily undergo hydrolysis, and hence find few practical applications.

To avoid the inherent shortcomings of the linear phosphonitrilic halides, highly crosslinked polymers of trimeric phenylphosphonitrile amides were subsequently developed which do not contain reactive halo substituents. These highly crosslinked polymers are formed by heating trimeric phenylphosphonitrile amide to a temperature in excess of about 270° C. Polymer formation occurs with the formation of the following repeating unit

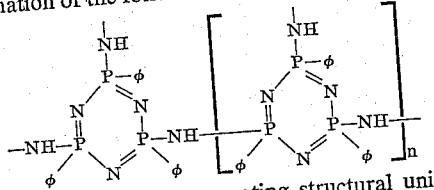

It is seen that the above repeating structural unit bears three linkage valences and results in a highly crosslinked lattice type structure. While this lattice type structure possesses many desirable characteristics where rigidity and high strength are required, it is found that the above phosphonitrilic polymers are too highly crosslinked to be readily soluble in most solvents. Furthermore, the highly crosslinked materials do not possess the flexibility required for many applications. It is generally conceded that a predominantly linear phosphonitrilic polymer which possesses chemical inertness would be a useful addition to the family of inorganic polymers.

It is therefore an object of the present invention to provide a novel class of phosphonitrilic polymers.

It is another object to provide novel mono- and dihalogenated phenyl triphosphonitriles.

It is a further object to provide novel mono- and dihalogenated phenyl triphosphonitriles from which predominantly linear phosphonitrilic polymers may be ultimately obtained.

It is still another object to provide linear phosphonitrilic polymers which possess a high degree of thermal stability and chemical inertness.

It is yet a further object to provide a class of phosphonitrilic polymers which possess solubility in solvents and which may be used as surface coating compositions capable of being crosslinked to any desired degree.

These and still further objects of the present invention will become readily apparent to one skilled in the art from the detailed description and specific examples.

Broadly, the present invention contemplates novel halo (phenylphosphonitriles) of the following formulae:

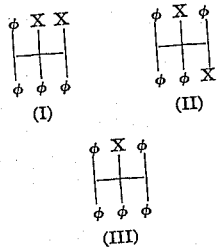

The invention also contemplates polymerizable ammoniated derivaties of the above phosphonitriles and polymers derived therefrom.

In the above formulae and occasionally hereafter, the planar trimeric phosphonitrilic ring

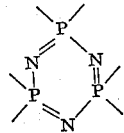

is represented from a side elevation as a straight line so that the sterero-isomerism of the phenyl (φ), halo (X=Cl or Br), and other substituents may more easily be illustrated.

Compound I as illustrated above is named cis-2,4-dihalo-2,4,6,6-tetraphenyltriphosphonitrile, Compound II is trans-2,4 - dihalo-2,4,6,6-tetraphenyltriphosphonitrile, and Compound III is 2-halo-2,4,4,6,6-pentaphenyltriphosphonitrile.

Compounds I, II, and III may be converted to the corresponding amido derivatives by ammoniation to obtain the corresponding novel compounds set forth below

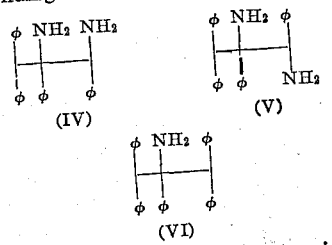

Compound IV illustrated above is cis-2,4-diamido-2,4,6,6 - tetraphenyltriphosphonitrile, V is trans-2,4 - di-amido-2,4,6,6-tetraphenyltriphosphonitrile, and VI is 2-amido-2,4,4,6,6-pentaphenyltriphosphonitrile.

Compounds IV and V may be individually or in combination heated under temperatures of from about 250 to 350° C. to obtain linear polymers which may be described as cyclic trimeric phenylated phosphonitrilic rings linked together by amido bonds. These polymers may graphically be shown as polymers possessing the repeating structural unit shown below

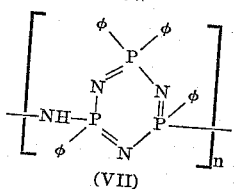

wherein $n$ represents the number of repeating units and $\phi$ represents phenyl. Furthermore, compounds IV and V may be condensed in the presence of certain amounts of compound VI to obtain a polymeric structure which is capped or terminated by pentaphenyltriphosphonitrile units. Such a terminated polymeric structure is illustrated below.

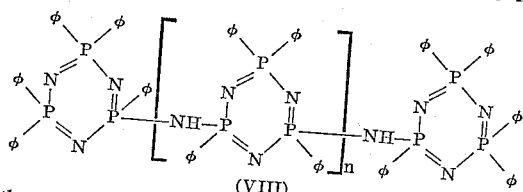

In the above formula $\phi$ represents phenyl and $n$ represents the number of repeating divalent functional units. The number $n$ and hence the molecular weight of the above structure may be regulated by adding controlled amounts of monoamidopentaphenyl substituted set forth as compound VI above, which acts as a chain stopping agent.

PREPARATION OF HALO PHENYLTRIPHOSPHONITRILES

We have found that good yields of compounds I, II and III set forth above may be made by reacting cis- or trans-2,4,6 - trihalo-2,4,6-triphenyltriphosphonitrile having the formulae

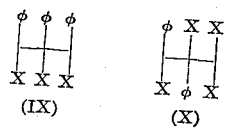

wherein $\phi$ represents phenyl and X represents bromo or chloro, with benzene in the presence of aluminum trichloride or aluminum tribromide.

The reaction may be carried out by adding anhydrous aluminum chloride or bromide to a rapidly stirred solution of 2,4,6 - trihalo-2,4,6-triphenyltriphosphonitrile in benzene and then heating the mixture at reflux. Dry inert gas such as nitrogen may be passed through the reaction mixture to remove hydrogen halide which is evolved. The hydrogen halide obtained from the reaction may be dissolved in water and titrated at intervals during the course of the reaction. These titrations will indicate the number of moles of halogen which is replaced by phenyl groups, and hence the progress of the phenylation may be determined at anytime during the reaction.

It is found that the phenylation reaction first substitutes one halo group to produce the compounds I and/or II set forth above. The second halo group is more difficult to substitute and longer reflux times are generally required. When it is desired to produce tetra phenylated compounds (I and II), that is compounds which bear two halo groups, the reaction is terminated when an amount of hydrogen chloride is liberated which corresponds stoichiometrically to the substitution of only one halo group.

On the other hand, if it is desired to obtain the compound of the Formula III bearing only one halo group, the reaction is run for a longer period until the amount of hydrogen halide evolved stoichiometrically represents the amount required for substitution of two halo groups.

It is found that the aluminum halide used in the reaction forms complexes with each Cl—P=N group present in the initial starting material. Hence, it is required to add an excess of the aluminum halide in order to carry out the reaction. This excess would be an amount greater than the molar amount of Cl—P=N units which are present in the initial material. These complexes which are formed in the reaction are decomposed in the presence of dilute mineral acids. Therefore, when the phenylation reaction is complete, the reaction mixture is admixed with a dilute mineral acid, such as hydrochloric and sulfuric acid.

Subsequent to decomposition of the complexes the mixture is extracted with an organic solvent such as benzene to remove the phenylated triphosphonitriles. Solvents other than benzene which may be used for the extraction include inert solvents such as diethyl ether, chloroform, and carbon tetrachloride. The organic extract solution may then be dried and the solvents are evaporated whereby a product residue is obtained which may be crystallized. Recrystallization may take place from any of the above organic solvents to give the desired phenyltriphosphonitrilic halide in the desired purity.

The benzene used in the present reaction is the compound from which the phenyl substituent is derived. It is therefore found quite convenient to use benzene as the solvent for the reaction as well as a reactant. However, if desired other solvents may be used in conjunction with benzene provided they are unreactive with either the starting compounds or the reaction products. Typical examples of solvents which may be used along with benzene are nitro-benzene and carbon disulfide. In view of the fact that these solvents result in the dilution of the concentration of benzene in the reaction mixture which in turn decreases the rate of reaction, it is preferred that the amount of these solvents be kept to a minimum.

In a preferred practice of the invention from about 10 to about 100 parts of benzene is employed per part of trichlorotriphenyltriphosphonitrile starting material. Furthermore, a ratio of from 40 to 60 parts of benzene per part of trichlorotriphenyltriphosphonitrile will provide particularly satisfactory results.

As pointed out above, complexes are formed with the aluminum halides used in the reaction, and an excess of aluminum halide is required. Generally, there is usually at least 6 moles of aluminum halide present per each mole of trichlorotriphenyltriphosphonitrile starting material, and as high as 50 moles of aluminum halide may be used. As a generally preferred range, from about 15 to 36 moles of aluminum halide per mole of trichlorotriphenyltriphosphonitrile is found to be particularly effective. If desired, the aluminum halide may be added to the reaction mixture all at once or in portions during the reaction.

Reaction conditions which are particularly inducive to formation of the desired phenylated compounds involve high speed agitation during the reaction period. This rapid agitation serves to disperse the aluminum halide-phosphonitrilic complexes which are present in an insoluble oil-like state. Unless this oil is kept in a dispersed condition the rate of the reaction is considerably decreased.

Temperatures used to carry out the present reaction will vary from about 50° to about 90° C. Ordinarily, the reaction temperatures at or about the boiling point of the solvent used (frequently benzene) are entirely satisfactory for the practice for the present invention. Temperatures in excess of the reflux temperature of the solvent used are contemplated provided suitable pressure equipment is used.

PREPARATION OF TETRA- AND PENTAPHENYLPHOSPHONITRILE AMIDES

The compounds cis - 2,4,diamido - 2,4,6,6 - tetraphenyltriphosphonitrile, trans - 2,4,diamido - 2,4,6,6-tetraphenyltriphosphonitrile, and 2 - amido - 2,4,4,6,6-pentaphenyltriphosphonitrile portrayed as compounds IV, V and VI above, which are used as intermediates in the preparation of the polymers set forth herein, are prepared by reacting the corresponding halo compounds I, II and III with ammonia. This is accomplished by either passing gaseous ammonia through a solution of I, II or III (or mixtures thereof) in an inert solvent, or by adding a solution of the halo compound to liquid ammonia.

During the course of the reaction the halo substituents of the triphosphonitrilic compounds are substituted by amido groups. Thus during the reaction ammonium chloride is produced in stoichiometric quantities. For each mole of halogen which is substituted one mole of ammonium chloride will be produced. This ammonium chloride is precipitated as the reaction proceeds. Subsequent to reaction, the precipitated ammonium halide may be titrated for chloride ion and hence serve as a measure of the completeness of the reaction.

Solvents which may be used during the ammoniation of the halo triphosphonitrile are inert solvents such as chloroform, carbon disulfide, carbon tetrachloride, and benzene.

Temperatures used for the ammoniation when ammonia gas is passed through a solvent of the halo (phenyltriphosphonitrile) range from about 0° to about 80 degrees C. When liquid ammonia is used temperatures in the range of from about −75 to about −35° C. are preferred. Using these temperatures substantial yields are obtained within ½ to 3 hours.

Subsequent to the ammoniation, the reaction mixture may be filtered to remove precipitated ammonium halide and the solvent may be removed by distillation. This will yield the desired amidotriphosphonitriles as a solid residue. The precipitated product may then be recrystallized from inert solvents such as chloroform-pentane, benzene-hexane, and cyclohexane to produce a product of the desired purity.

PREPARATION OF PHOSPHONITRILIC POLYMERS

The polymers of our present invention, which are defined as repeating amido (tetraphenyltriphosphonitrilic) units as units terminated by pentaphenyltriphosphonitrile set forth in Formula VIII above, are prepared by heating the amido derivatives IV, V and VI at temperatures of from about 250 to about 350° C., preferably under reduced pressure or under an inert atmosphere, such as helium or nitrogen.

During the heating step, the amido derivatives IV, V and VI condense through the amido groups with evolution of ammonia. It is seen that compounds IV and V bearing two amido groups will polymerize in a linear fashion. This polymerization will occur until terminated by the compound of Formula VI which bears a single amido group.

Using the temperatures in the range of 250 to 350° C. substantial polymerization is obtained in from about 10 to about 30 minutes. It is generally preferred that the polymerization be conducted under a vacuum to hasten removal of ammonia from the reaction mixture; although inert atmospheres at atmospheric pressure may be used. Pressures as low as 10⁻⁵ millimeters of mercury have been employed and even lower pressures would produce a desirable result.

The ammonia which is evolved from the polymerization may be collected in a suitable trap. Its volume may be measured and therefore the progress of the polymerization may be closely scrutinized.

The polymers obtained from the polymerization are soluble in a variety of organic solvents such as benzene, chloroform, acetonitrile, dioxane, ethyl acetate, acetone and dimethyl formamide. The polymers may possess a molecular weight of from about 2000 to about 4000.

These inorganic polymers which do not possess carbon to carbon bonds in the backbone chain are extremely stable towards heat. These polymers are useful in the range of from about 300 to about 1000° C.

The above linear polymers may be effectively crosslinked by using a small amount of 2,4,6-triamido-2,4,6-triphenyltriphosphonitrile as a crosslinking agent. The 2,4,6 - triamido - 2,4,6 - triphenyltriphosphonitrile may be obtained by reacting phenyltetrachlorophosphorane, and ammonium chloride. This results in a 2,4,6-trichloro-2,4,6-triphenyltriphosphonitrile which may be ammoniated in a manner similar to that described in the preparing of compounds IV, V and VI of the present invention. Incorporation of these triamidotriphenyltriphosphonitriles results in the formation of crosslinks which are illustrated in the unit formula set forth below

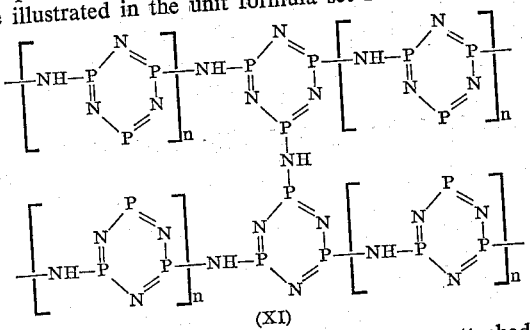

(XI)

(In the above formula the phenyl groups attached to the phosphorus atoms have been omitted for clarity.)

In practice, the crosslinking of the present linear polymers is obtained by adding from about 1 to about 25% of 2,4,6 - triamido - 2,4,6 - triphenyltriphosphonitrile by weight of the linear polymer.

In a typical coating composition from about 10 to about 50% by weight of the above polymer (XI) may be combined with a solvent such as chloroform, dimethylformamide, or other non-reactive solvent. Such a coating solution is applied to a substrate, the solvent is evaporated, and final curing of the polymers takes place at the condensation temperature of about 250 to 350° C. Such coating is tough, impact resistant, and insoluble in most common organic solvents. Furthermore, the coating is resistant to hydrolysis and temperatures up to about 500° C.

Having described the basic aspects of the present invention the following specific examples are given to illustrate embodiments thereof.

Example I

To a solution of 10.0 g. of trans-2,4,6-trichloro-2,4,6-triphenyltriphosphonitrile in 200 ml. of benzene (dried over calcium hydride), was added 60 g. of anhydrous aluminum chloride and an additional 100 ml. of anhydrous benzene. The mixture was agitated vigorously and heated at reflux. Dry nitrogen gas was passed through the mixture, then into a stirred water trap containing thymol blue indicator. The absorbed hydrogen chloride then was titrated with 0.1 N sodium hydroxide at intervals.

After 1 hour of refluxing, the reaction was about 30% complete for substitution of one phenyl group. An additional 15 g. of anhydrous aluminum chloride was added and stirring and refluxing were continued. After a total of 1.75 hours the reaction was nearly 60% completed. An additional 15 g. portion of aluminum chloride was added, and, after a total of 2.75 hours, the reaction was 95% completed. A further 10 g. of anhydrous aluminum chloride was added, and the mixture was stirred and refluxed an additional 20 minutes (total time of reflux, about 3 hours). By HCl measurement the reaction was 115% completed for substitution of one phenyl group, i.e., one chloride atom had been completely substituted, a second had been partially (15%) substituted.

The reaction mixture was cooled, then added slowly to a mixture of ice, water and 10% hydrochloric acid to decompose the metal halide complexes. The entire mixture was transferred to a separatory funnel where the layers were seperated. The aqueous portion was extracted four times with benzene, and the combined organic solutions were dried over anhydrous magnesium sulfate, then filtered.

Evaporation of the benzene filtrate gave 10.66 g. of crude solid which was fractionally crystallized from cyclohexane. A first crop weighing 3.82 g. was obtained, M. 180–92° C., of cis-2,4-dichloro-2,4,6,6-tetraphenyltriphosphonitrile. An analytical sample melted at 195–6° C.

Calculated for $C_{24}H_{20}N_3P_3Cl_2$: C=56.05; H=3.92; N=8.17; Cl=13.79; mol. wt. 514. Found: C=55.78; H=3.25; N=8.66; Cl=14.33; mol wt. 510.

Concentration of the cyclohexane filtrate gave 3.65 g. of a second crop, M. 164–6° C. of trans-2,4,6,6-tetraphenyltriphosphonitrile. An analytical sample melted at 169–70° C.

Calculated for $C_{24}H_{20}N_3P_3Cl_2$: C=56.05; H=3.92; N=8.17; Cl=13.79; mol. wt. 514. Found C=55.92; H=3.93; N=8.06; Cl=13.27; mol wt. 529.

Dilution of this second filtrate with pentane produced 2.04 g. of a third crop which melted from 150 to 175° C. Fractional recrystallization gave 0.38 g. of cis-tetraphenyldichloro compound, M. 185–9° C., and 1.02 g. of a solid solution of the cis- and trans-dichloro isomers which melted at 152–9° C.

The infrared spectra of the cis- and trans-isomers, as well as of the solid solution, were identical. Elemental analysis of the solid solution also agreed with that of a solid solution of the two isomers.

Calculated for $C_{24}H_{20}N_3P_3Cl_2$: C=56.05; H=3.92; Cl=13.79%. Found: C=56.21; H=3.98; Cl=14.27%.

*Example II*

In a manner analogous to that of Example I, 10.0 g. of cis-2,4,6-trichloro - 2,4,6 - triphenyltriphosphonitrile was treated with anhydrous aluminum chloride. After 1.1 equivalents of hydrogen chloride had been evolved, the reaction mixture was quenched in ice-water-dilute hydrochloric acid, then treated as before. There was obtained 10.5 g. of crude product which upon recrystallization from cyclohexane gave 8.20 g. of a mixture of trans- and cis-2,4 - dichloro-2,4,6,6-tetraphenyltriphosphonitrile, M. 150–180° C.

*Example III*

To a solution of 5.00 g. of trans-2,4,6-trichloro-2,4,6-triphenyltriphosphonitrile in 100 ml. of anhydrous benzene was added 21.2 g. of anhydrous aluminum chloride and 50 ml. of benzene. The mixture was stirred vigorously and heated at reflux for 52 hours. During this time about two equivalents of hydrogen chloride were evolved.

The mixture was quenched and then treated as in Exampl I, giving 5.45 g. of crude solid, which on recrystallization from cyclohexane gave 4.25 g. of 2-chloro-2,4,4,6,6 - pentaphenyltriphosphonitrile, M. 145–8° C. An analytical sample melted at 151–2° C.

Calculated for $C_{30}H_{25}N_3P_3Cl$: C=64.81; H=4.53; N=7.57; Cl=6.38%; mol. wt. 556. Found: C=65.36; H=4.68; N=7.45; Cl=6.47%; mol. wt. 524.

*Example IV*

In a manner analogous to that of Example II, 5.00 g. of cis-2,4,6-trichloro-2,4,6,-triphenyltriphosphonitrile gave 4.00 g. of 2-chloro-2,4,4,6,6-pentaphenyltriphosphonitrile, M. 149–51° C.

*Example V*

The procedures of Example 1 are followed except employing approximately equal volumes of anhydrous benzene and nitrobenzene and heating at 80–90° C. throughut the course of the reaction. Substantially the same sults are obtained as in Example I, except that heating times nearly double those of Examples I and II were required.

*Example VI*

The procedure of Example II is followed except employing anhydrous aluminum bromide, in place of the aluminum chloride. Substantially the same yield of cis- and trans-2,4-dichloro-2,4,6,6-tetraphenyltriphosphonitrile is obtained.

*Example VII*

Anhydrous gaseous ammonia was passed slowly through 75 ml. of rapidly stirred chloroform. To this was added a solution of 1.50 g. of cis-2,4-dichloro-2,4,6,6-tetraphenyltriphosphonitrile in 25 ml. of chloroform over a period of 45 minutes. The temperature of the reaction mixture was maintained at 16–20° C. After all of the dichloro compound had been added the mixture was stirred 1 hour under a stream of ammonia at a temperature of 16–28° C. The passage of ammonia was discontinued and the mixture was stirred and heated an additional 1.25 hours at 30–50° C.

Filtration gave 0.32 g. of ammonium chloride (theoretical=0.313 g.). Evaporation of the filtrate gave 1.54 g. of white solid which on recrystallization from benzene-pentane gave crystals of cis-2,4-diamido-2,4,6,6-tetraphenyltriphosphonitrile, M. 191–2° C.

Calculated for $C_{24}H_{24}P_3N_5$: C=60.63; H=5.09; N=14.73; mol wt. 475.4. Found: C=60.56, 60.68; H=5.25, 5.86; N=14.53, 14.64; mol. wt. 492 (in acetonitrile).

*Example VIII*

In an analogous manner to that described in Example VII, 1.50 g. of trans-2,4-dichloro-2,4,6,6-tetraphenyltriphosphonitrile was ammoniated 5 hours at 10–39° C. Filtration of the reaction mixture gave 0.303 g. of ammonium chloride (theoretical=0.313 g.). Evaporation of the filtrate gave 1.47 g. of solid, which, recrystallized frome benzene-pentane, melted at 149–50° C.

Calculated for $C_{24}H_{24}P_3N_5$: C=60.63; H=5.09; N=14.73; mol. wt.=475.4. Found: C=60.89; H=5.13; N=14.40; mol. wt.=497 (in acetonitrile).

*Example IX*

In a manner analogous to that of Example VIII, 1.50 g. of a solid solution of cis- and trans-isomers of 2,4-dichloro-2,4,6,6-tetraphenyltriphosphonitrile, M. 152–9°, was ammoniated to produce 1.48 g. of a mixture of cis- and trans-isomers of 2,4-diamido-2,4,6,6-tetraphenyltriphosphonitrile.

*Example X*

In a manner analogous to that of Example VIII, 0.50 g. of 2 - chloro - 2,4,4,6,6 - pentaphenyltriphosphonitrile was ammoniated 4 hours at 19–33° C. Filtration of the reaction mixture gave 0.0465 g. of ammonium chloride (theoretical=0.0481 g.). Evaporation of the filtrate gave 0.45 g. of 2-amido-2,4,4,6,6-pentaphenyltriphosphonitrile which recrystallized from benzenepentane, melted at 170–175° C.

*Example XI*

In a high vacuum apparatus 0.5 g. of cis-2,4-diamido-2,4,6,6-tetraphenyltriphosphonitrile was heated slowly by means of an oil bath to 345–365° C. in 1 hour then heated 3 hours at 345–365° C. The pressure was maintained at $10^{-4}$ to $10^{-5}$ millimeters of mercury and the evolved gas was collected in a trap cooled with liquid nitrogen.

At the end of this heating there had been collected 1.00 mole of ammonia per mole of diamidophosphonitrile. The solid polymer was very soluble in benzene, chloroform, acetone, ether and dimethylformamide. Its infrared spectrum showed strong absorption at 1210 cm.$^{-1}$ showing the presence of the cyclic trimeric phosphonitrilic ring. Also an absorption at 940 cm.$^{-1}$, showing the presence of P—NH—P. Its molecular weight, determined in benzene by vapor pressure osmometry, was 2940.

Example XII

In a manner analogous to that of Example XI, 0.50 g. of trans - 2,4-diamido-2,4,6,6-tetraphenyltriphosphonitrile was polymerized 2.5 hours at 343–360° C. and at pressures of $10^{-4}$ to $10^{-5}$ millimeters of mercury. At the end of this time there had been evolved 1.04 mole of ammonia per mole of diamidophosphonitrile. The residual polymer had exactly the same solubility characteristics as did that from the cis-diamido compound. Its infrared spectrum also showed strong triphosphonitrilic ring absorption at 1210 cm.$^{-1}$. Its molecular weight, determined by vapor pressure osmometry in benzene, was 2490.

Example XIII

In a manner analogous to that of Example XI, 0.50 g. of the mixture of cis- and trans-2,4-diamido-2,4,6,6-tetraphenyltriphosphonitrile, prepared as in Example IX was heated under reduced pressure to produce a polymer having properties similar to those of the polymers prepared in Examples XI and XII.

Example XIV

A solution was prepared from 1.00 g. of the polymer from trans - 2,4-diamido-2,4,6,6-tetraphenyltriphosphonitrile (prepared as in Example XII), 0.10 g. of trans-2,4,6-triamido-2,4,6-triphenyltriphosphonitrile, and 3.7 g. of N,N-dimethylformamide. This solution was brushed onto anodized aluminum, stainless steel, and titanium strips. The coated strips were air dried overnight, then heated 2 hours at 145–150°, then 2 hours at 200°, and finally 2 hours at 300–325°.

The coatings are highly adherent to the metal substrates, are tough and resistant to impact, and are insoluble in common organic solvents such as chloroform, benzene, acetone, etc. In addition, the coatings are not affected by immersion in boiling water.

We claim:
1. Compounds selected from the group consisting of cis-2,4-dichloro-2,4,6,6 - tetraphenyltriphosphonitrile and trans-2,4-dichloro-2,4,6,6-tetraphenyltriphosphonitrile.
2. The compound cis 2,4-dichloro-2,4,6,6-tetraphenyltriphosphonitrile.
3. The compound trans 2,4-dichloro-2,4,6,6-tetraphenyltriphosphonitrile.
4. A method for preparing compounds of the formula

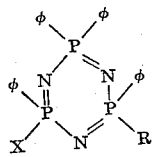

wherein $\phi$ represents phenyl, X is selected from the group consisting of bromine and chlorine, and R is selected from the group consisting of phenyl, bromine and chlorine which comprises forming a reaction mixture of 2,4,6-trihalo-2,4,6-triphenyltriphosphonitrile with benzene and an aluminum halide of the formula AlX$_3$, wherein X is selected from the group consisting of chlorine and bromine, said AlX$_3$ being present in amounts greater than 3 moles of AlX$_3$ per mole of 2,4,6-trihalo-2,4,6-triphenyltriphosphonitrile, heating said reaction mixture to a temperature of from about 50 to about 90° C. until hydrogen halide is evolved, and recovering the above triphosphonitrile compound from the reaction mixture.
5. The method of claim 4 wherein said AlX$_3$ compound is present in amounts ranging from about 6 to about 50 moles of trihalotriphenyltriphosphonitrile present.
6. The method of claim 5 wherein from about 10 to about 100 parts by weight benzene is present per part of trihalotriphenyltriphosphonitrile present.
7. The method of claim 4 carried out in the presence of an inert solvent.
8. The method of claim 4 wherein subsequent to heating said reaction mixture is contacted with a mixture of water and mineral acid to decompose aluminum halide complexes which are present, and the desired phosphonitrilic halide is extracted with a water immiscible inert solvent.
9. Compounds selected from the group consisting of cis - 2,4 - diamido - 2,4,6 - tetraphenyltriphosphonitrile and trans-2,4-diamido-2,4,6,6-tetraphenyltriphosphonitrile.
10. The compound cis 2,4-diamido-2,4,6,6-tetraphenyltriphosphonitrile.
11. The compound trans 2,4 - diamido - 2,4,6,6 - tetraphenyltriphosphonitrile.
12. A phosphonitrilic polymer possessing the repeating structural unit

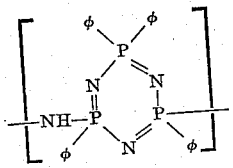

wherein $\phi$ represents phenyl.
13. A phosphonitrilic polymer possessing the structure

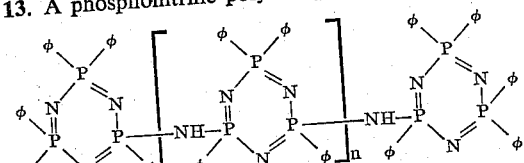

wherein $\phi$ represents phenyl, and $n$ is an integer of from about 1 to about 10.
14. A crosslinked phosphonitrilic polymer which contains the structural unit

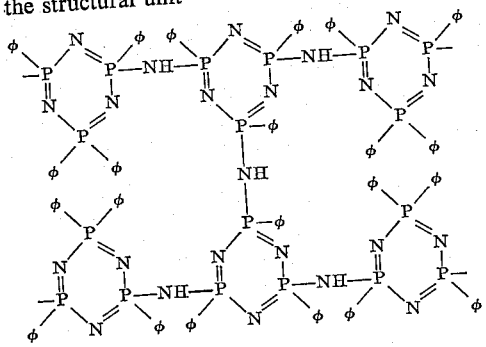

wherein $\phi$ is phenyl.
15. A method for preparing a linear phosphonitrilic polymer possessing the repeating structural unit

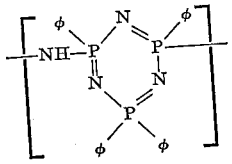

wherein $\phi$ represents phenyl which comprises heating a compound of the formula

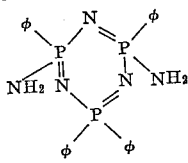

wherein $\phi$ represents phenyl to a temperature of from about 250 to 350° C.
16. The method of claim 12 wherein said heating is conducted under vacuum.
17. The method of claim 12 wherein said heating is conducted under an atmosphere of inert gas.
18. The method of claim 13 wherein said heating is discontinued when ammonia ceases to evolve.

19. A method for preparing a substantially linear phosphonitrilic polymer of the structure

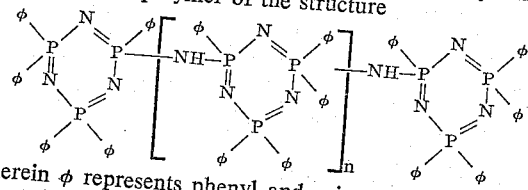

wherein φ represents phenyl and n is an integer of from about 1 to about 10 which comprises heating a mixture comprising 2,4-diamido-2,4,6,6-tetraphenyltriphosphonitrile, and 2-amido-2,4,4,6,6-pentaphenyltriphosphonitrile, said 2-amido-2,4,4,6,6-pentaphenyltriphosphonitrile being present in amounts of from about 0.01 to about 2.0 moles per mole of said 2,4-diamido-2,4,6,6-pentaphenyltriphosphonitrile, to a temperature of from about 250 to 350° C., and continuing said heating until ammonia substantially ceases to evolve.

20. The method of claim 15 wherein said heating is conducted under reduced pressure.

21. The method of claim 15 wherein said heating is conducted under an atmosphere of inert gas.

22. A method for preparing a crosslinked phosphonitrile polymer containing the unit

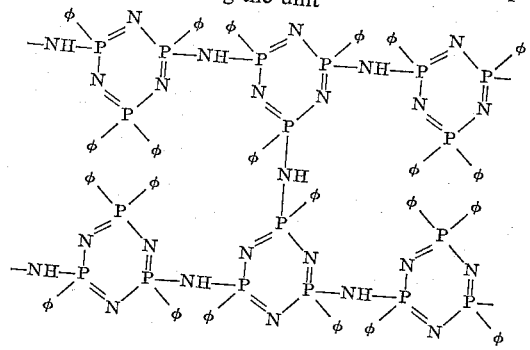

which comprises heating 2,4-diamido-2,4,6,6-tetraphenyltriphosphonitrile in the presence of from about 0.01 to about 1.0 mole of 2,4,6-triamido-2,4,6-triphenyltriphosphonitrile per mole of 2,4-diamido-2,4,6,6-tetraphenyltriphosphonitrile to a temperature of from about 250 to 350° C. until ammonia ceases to evolve.

23. The method of claim 22 wherein said heating is conducted under reduced pressure.

24. The method of claim 22 wherein said heating is conducted under an atmosphere of inert gas.

25. A surface coating composition comprising a mixture of from about 1 to about 100 parts by weight of 2,4-diamido-2,4,6,6-tetraphenyltriphosphonitrile per parts by weight of 2,4,6-triamido-2,4,6-triphenyltriphosphonitrile dissolved in a volatile inert solvent.

26. The composition of claim 25 wherein the inert solvent possesses a boiling point of from about 50 to about 200° C.

27. A method for forming a polymeric phosphonitrilic coating on an object which comprises coating said object with the composition of claim 25, and subsequently heating the coating to a temperature of from about 200 to 350° C. until ammonia substantially ceases to evolve.

References Cited by the Examiner

Becke-Goehring et al., "Zeitschrift fur Anorganische und Allgemeine Chemie," vol. 304, 1960, pp. 126–136.

Bezman et al., "Chemistry and Industry," January 26, 1963, pp. 163–4.

Moeller et al., "Chemistry and Industry," February 24, 1962, pp. 361–2.

Shaw et al., "Chemistry and Industry," September 17, 1960, pp. 1189–1190.

Shaw, "Journal of Polymer Science," March 1961, vol. 50, pp. 21–30.

SAMUEL H. BLECH, *Primary Examiner.*